(12) United States Patent
Finkelstein

(10) Patent No.: US 12,414,100 B2
(45) Date of Patent: Sep. 9, 2025

(54) USING POWER DOMAIN NOMA FOR CONTINUOUS BANDWIDTH REQUESTS

(71) Applicant: Cox Communications, Inc., Atlanta, GA (US)

(72) Inventor: Jeff Finkelstein, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 18/489,504

(22) Filed: Oct. 18, 2023

(65) Prior Publication Data
US 2024/0049209 A1 Feb. 8, 2024

Related U.S. Application Data

(63) Continuation of application No. 17/178,205, filed on Feb. 17, 2021, now Pat. No. 11,849,441.

(51) Int. Cl.
| | |
|---|---|
| *H04W 72/04* | (2023.01) |
| *H04B 3/03* | (2006.01) |
| *H04L 5/00* | (2006.01) |
| *H04W 72/044* | (2023.01) |
| *H04W 72/0446* | (2023.01) |

(52) U.S. Cl.
CPC .......... *H04W 72/0473* (2013.01); *H04B 3/03* (2013.01); *H04L 5/0053* (2013.01); *H04W 72/0446* (2013.01)

(58) Field of Classification Search
CPC .......... H04W 72/0473; H04W 72/0446; H04L 5/0053; H04B 3/03
See application file for complete search history.

(56) References Cited

U.S. PATENT DOCUMENTS

| | | | | |
|---|---|---|---|---|
| 11,849,441 | B2 * | 12/2023 | Finkelstein | ........... H04L 5/0053 |
| 2002/0159513 | A1 * | 10/2002 | Williams | ............ H04L 12/5602 |
| | | | | 375/257 |

\* cited by examiner

*Primary Examiner* — Brenda H Pham
(74) *Attorney, Agent, or Firm* — Eversheds Sutherland (US) LLP

(57) ABSTRACT

The present disclosure relates to multi-MAC controller and single PHY systems and methods. An example method may include transmitting, via a first device in a Data Over Cable Service Interface Specification (DOCSIS) network, a first block of data within a first time slot and at a first power level. The example method may also include transmitting, via a second device in the DOCSIS network, a second block of data within the first time slot and at a second power level, the second power level being based on an attenuation of the first network tap device associated with the first device, wherein the first power level is different from the second power level.

20 Claims, 9 Drawing Sheets

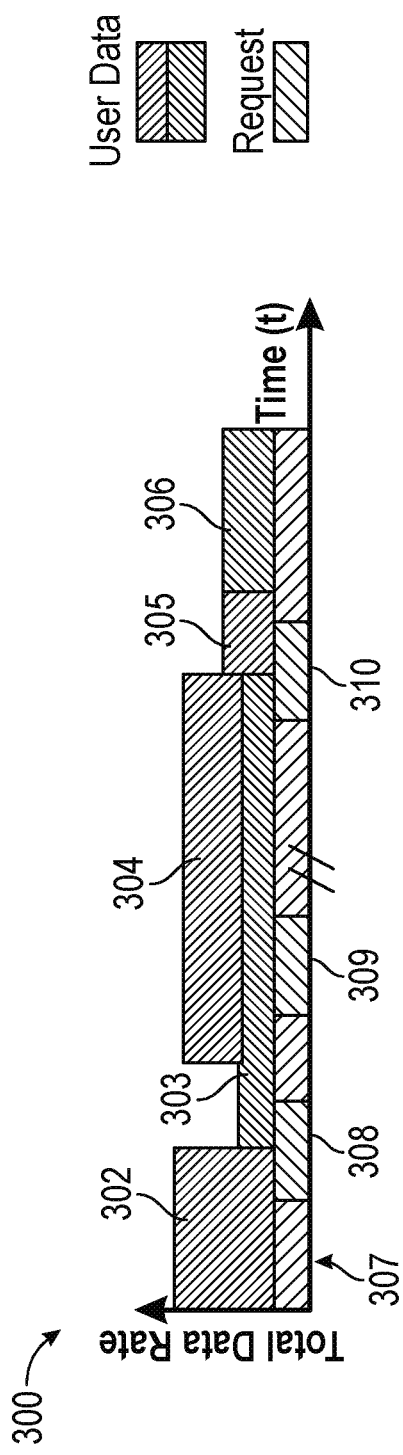
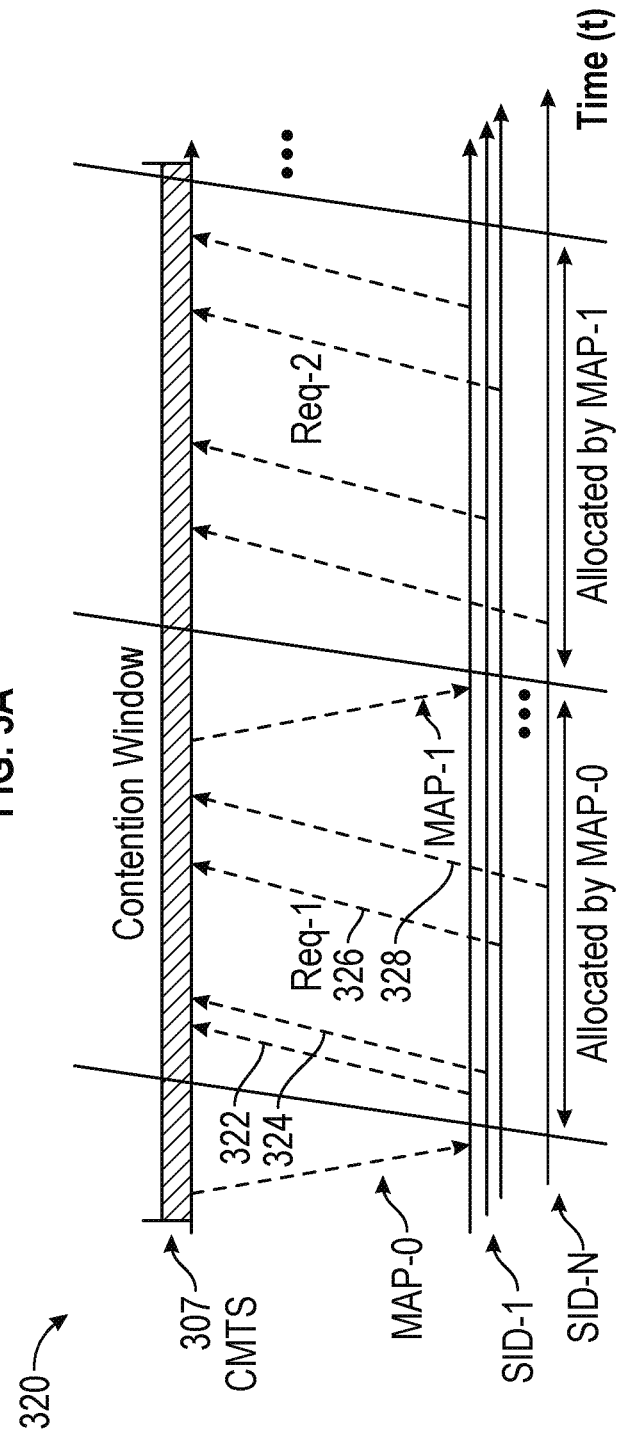
FIG. 3A
FIG. 3B

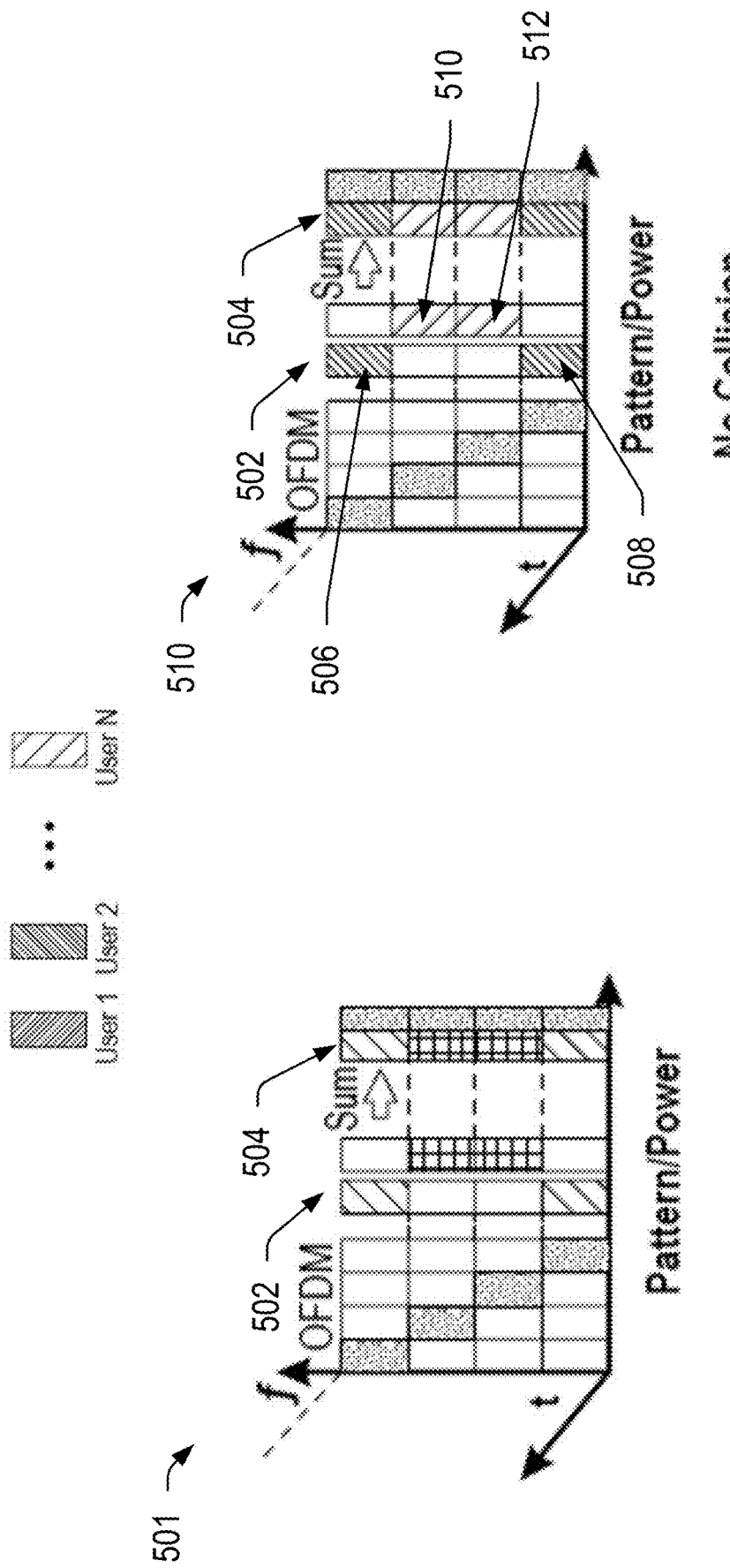
FIG. 5A Collision
FIG. 5B No Collision

USING POWER DOMAIN NOMA FOR CONTINUOUS BANDWIDTH REQUESTS

CROSS-REFERENCE TO RELATED APPLICATIONS

This application is a continuation of U.S. patent application Ser. No. 17/178,205, filed Feb. 17, 2021, which is hereby incorporated by a reference.

TECHNICAL FIELD

The disclosure generally relates to the use of power domain Non-Orthogonal Multiple Access (NOMA) for data transmissions in networks.

BACKGROUND

From wireless to wireline networks, to support multiuser connectivity, multiple access technologies of time division multiple access (TDMA), frequency division multiple access (FDMA) and orthogonal frequency division multiple access (OFDMA) may often be extensively investigated and deployed. In spite of the very different approaches to share the channel resources, the aforementioned methods may be designed to arrange one resource element (RE) for one user at the receiver side. In other words, they may be operated in an orthogonal multiple access (OMA) scheme. As the user number increases, OMA faces significant challenges in time scheduling and RE arrangement, as well as difficulties in fully utilizing channel resources if there are multiple service subscribers requiring different time delay tolerance and data capacity. One potential challenge may involve the management of uplink and/or downlink bandwidth requests by devices in a network. Conventional approaches may involve the use of contention windows, which may be designated timeslots during which devices may make bandwidth requests for subsequent data transmissions. These contention windows may be separate from timeslots during which the devices transmit data payloads, which may result in the contention windows taking up time during which data transmissions may otherwise be performed. Additionally, because multiple devices may be making bandwidth requests during the designated contention windows, there exists the potential for collisions to occur between requests from different devices. This may result in inefficiencies as certain requests may be lost as a result of such collisions.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIGS. 3A-3C depict an example uplink/downlink procedure, in accordance with one or more example embodiments of the disclosure.

FIGS. 5A-5B depict examples of using varying power level transmissions for collision avoidance, in accordance with one or more example embodiments of the disclosure.

DETAILED DESCRIPTION

Figure 1:
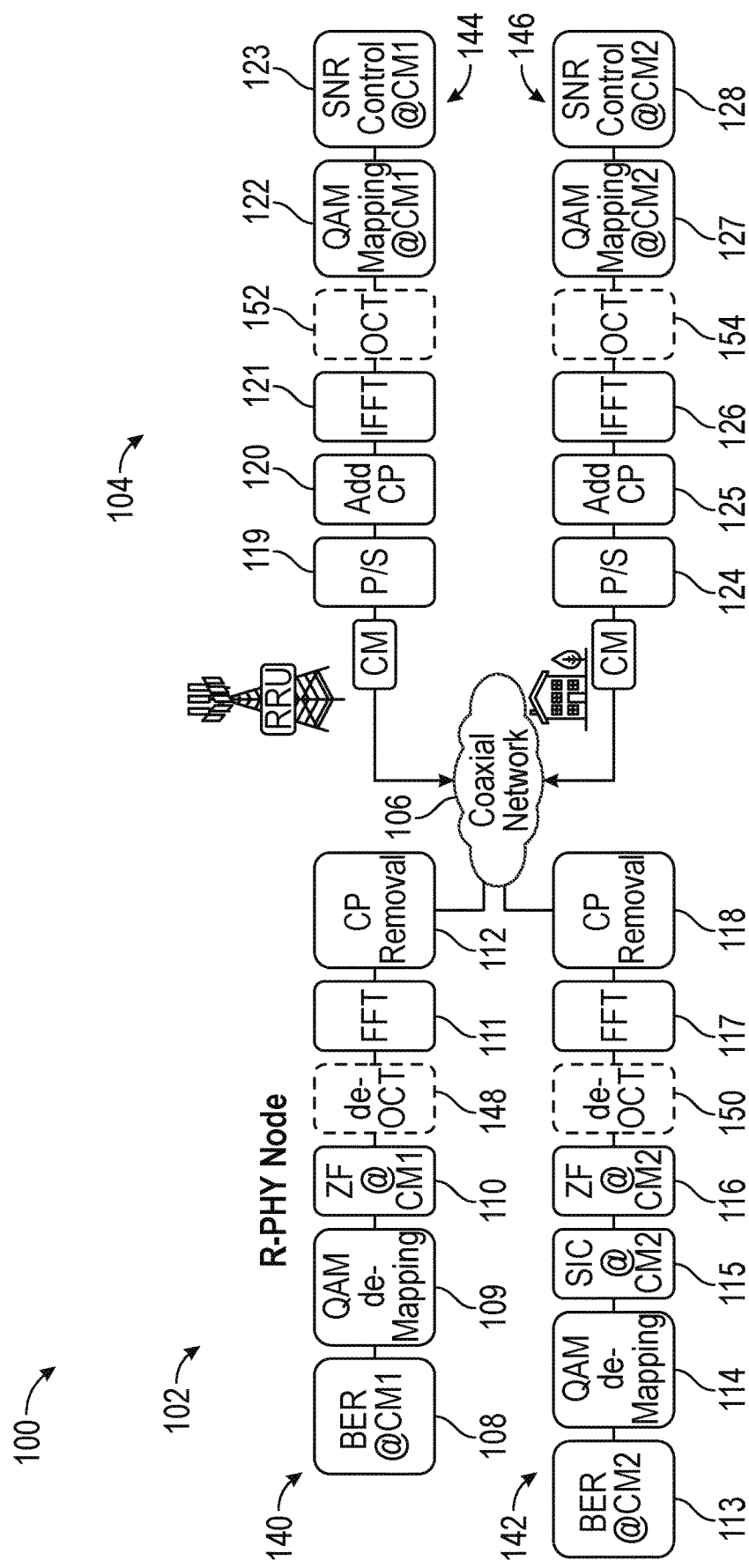
FIG. 1 depicts an example network architecture, in accordance with one or more example embodiments of the disclosure.

The disclosure is directed to, among other things, using power domain Non-Orthogonal Multiple Access (PD-NOMA) to allow for continuous bandwidth requests by one or more devices in a network (reference may be made herein to a DOCSIS network, however, the same continuous bandwidth request methods described herein may also be applied to any other type of network as well). In particular, the disclosure may pertain to eliminating the need for a designated contention window in a network by transmitting bandwidth requests from devices within the same timeslots as normal data payloads, but at different power levels than the data payloads based on a PD-NOMA scheme.

Before NOMA, networks may have employed Orthogonal Multiple Access (OMA). OMA may be a network modulation scheme in which multiple users may be able to transmit data on a network through the use of orthogonal network resources within either a specific time slot, frequency band, or code in order to avoid multiple access interference. For example, previous OMA schemes employed before NOMA may include, frequency division multiple access (FDMA) of the first generation (1G), time division multiple access (TDMA) of the second generation (2G), code division multiple access (CDMA) of the third generation (3G), and orthogonal frequency division multiple access (OFDMA) of the fourth generation (4G). One potential challenge may involve the management of uplink and/or downlink bandwidth requests by devices in a network using these OMA schemes. Conventional OMA networks may involve the use of designed bandwidth request windows, which may be designated timeslots during which devices may send bandwidth requests in order to determine when they may subsequently transmit data payloads over the network. Such bandwidth request windows may be referred to herein as "contention windows" because they may be contention-based time slots during which multiple devices may make bandwidth requests at the same time. Once a contention window has passed, data payloads may then be transmitted by the devices based on the scheduling results of the contention window. Due to the conventional contention windows being designated timeslots during which data payloads may typically not be transmitted, the amount of data that may be transmitted through a network in a given time period may be reduced by the amount of time taken up by one or more of such contention windows. Additionally, because multiple devices may be making bandwidth requests during the designated contention windows at the same time, there exists the potential for collisions to occur between requests from different devices. This may result in inefficiencies as certain requests may be lost as a result of such collisions.

NOMA may differ from the aforementioned OMA modulation schemes by allowing data to be transmitted across a network using non-orthogonal network resources (for example, data blocks may be sent at different power levels instead of in different time slots or at different frequencies). This may allow for certain network resources (such as a single resource element (RE), multiple REs, a resource block time slot, etc.) to be shared by multiple users, which may improve network flexibility and expansibility. In general, NOMA schemes can be classified into two types: power-domain multiplexing and code-domain multiplexing. In power-domain multiplexing, different users may be allocated different power coefficients according to their channel conditions in order to achieve a high-system performance. In some cases, the amount of the power domain that are used by individual users may be equal, however, in other cases, different users may utilize different amounts of the power domain in a given network resource. In particular, multiple users' data signals may be combined at the transmitter side. At the receiver side, successive interference cancellation (SIC) may be used to decode the signals until the desired user's signal remains. In code-domain multiplexing, different users may be allocated different codes and multiplexed over the same time-frequency resources. The systems and methods described herein may primarily pertain to PD-NOMA, but may also apply to other variants of NOMA in some cases as well.

The systems and methods described herein may serve to eliminate these designated contention windows by "embedding" the bandwidth requests in data payloads. In some instances, embedding the bandwidth requests in the data payloads may refer to transmitting the bandwidth requests at the same time and/or same frequency as the data payloads, but at different power levels than the data payloads (for example, based on the PD-NOMA scheme). Thus, reference to "eliminating" the contention window may not necessarily mean that uplink and/or downlink bandwidth requests are no longer transmitted but may rather refer to the fact that the contention window may not take up its own designated timeslot. Rather, the uplink and/or downlink bandwidth requests may be transmitted at the same time (and/or at the same frequency) as data payloads being transmitted by the devices by transmitting the bandwidth requests at different power levels than the data payloads. In this regard, the contention window may actually be made "infinite" (for example, as shown by the contention window 304 in FIGS. 3A-3C) in that uplink and/or downlink bandwidth requests may be made at any time, even when other data payloads are currently being transmitted across the network by other devices. This infinitely long contention window described herein may provide a number of benefits, such as eliminating the need for a designated contention window time slot, saving request-and-grant duration, and reducing the frequency of collisions that may otherwise occur during a conventional designated contention window timeslot in which multiple devices make bandwidth requests during a short period of time.

In some embodiments, because the contention window described herein may be an "infinite" contention window, any device may send a bandwidth request at any given time, regardless of any other data payloads that may be currently being transmitted by other devices in the network. In some instances, the times at which different devices may send bandwidth requests may be random. That is, the devices in the network may individually select a time at random to send a bandwidth request. The likelihood of collision between such requests may be reduced even though the devices may send these requests at randomly selected times because the contention window is made infinite rather than the contention window taking place during the shorter conventional designated time slot. Additionally, the specific application of PD-NOMA in DOCSIS networks in particular may further reduce the likelihood of collisions (even when devices are transmitting at random) as signal transmission power levels from different customer devices in a DOCSIS network may be based on properties of the tap devices (and other devices) in the network, rather than the transmission power levels being actively controlled by a centralized management system. For example the tap devices may be associated with unique signal attenuation values (in some instances, refer to a "power level" of a tap may also refer to this signal attenuation of the tap as well) that may decide the amount of signal that is "dropped off" to customer devices and subtracted from an output signal of the tap device. With respect to a DOCSIS network in particular, groups of customer devices may be connected to different tap devices on a network. For example, a first group of five customer devices may be connected to a first network tap, a second group of six customer devices may be connected to a second network tap, and so on (these are just examples of numbers of devices that may be connected to a given tap, and any other number of devices may also be connected to a tap as well). These tap devices may be inserted into locations on a network and may be used to split or copy packets from the network for creating additional customer service access points. A tap may also be associated with a split ratio, which may be indicative of a percentage of signal received by the tap that is passed through the tap and downstream the network versus a percentage of signal that is split off for creating additional network terminations. The customer devices connected to the different taps may operate at different power levels. That is, individual network taps may attenuate a signal received from an upstream portion of the network down to a particular power level based on the properties of the individual tap. This attenuated signal may then be output by the tap downstream the network to additional tap devices and their associated customer devices. The closer a network tap is to an upstream signal origination point on the network, the higher the signal power level may be provided to the customer devices associated with that tap.

In some embodiments, instead of sending bandwidth requests at random time intervals, devices may send bandwidth requests in a similar manner in which the bandwidth requests may be sent in a conventional contention window during a designated timeslot but rather may be send at the same time data payloads from other devices are being transmitted. For example, the devices may listen to the network to determine whether it remains free of transmissions, or transmissions are currently taking place. Individual devices may have associated "back-off" counters. If the network is still free after the duration of the counter, the device can send its data payload. If during the back-off time another station begins transmitting data, the back-off counter is frozen and counting down starts again when the network returns to the idle state. In some cases, different devices may be scheduled to send bandwidth requests at different time intervals. In even further embodiments, the timing at which any of the devices in the network transmit bandwidth requests through the "infinite" contention window may be determined in any other suitable manner as well.

In some embodiments, interference cancellation (for example, successive interference cancellation (SIC) or parallel interference cancellation (PIC), as well as any other types of interference cancellation) may be used at the receiver side to separate out combined signals including transmissions from multiple transmitter devices at multiple different power levels into the one or more transmissions associated with the transmitter that the receiver desired to receive information from. In some instances, the interference cancellation may more specifically relate to minimum mean square error (MMSE) cancellation. SIC may involve decoding and removing signals associated with individual devices one at a time before decoding and obtaining signals for additional devices. PIC may involve decoding and obtaining signals for different devices simultaneously. As one general example of interference cancellation, a data payload transmitted by a first device may transmit a bandwidth request a power level of 25 dB and a bandwidth request for a second device may transmit a data payload at a power level of 10 dB. Using PD-NOMA, these two transmissions may be performed at the same time by stacking them at the different power levels in the signal transmission. At the receiver side, if the receiver wants to separately read the bandwidth request from the second device, the interference cancellation may be used to separate out the 10 dB signal from the 25 dB signal in order to obtain the bandwidth request from the second customer device. In other words, multiple users' signals may be combined at the transmitter side. At the receiver side, successive interference cancellation (SIC) may be used to decode the signals until the desired user's signal remains. In code-domain multiplexing, different users may be allocated different codes and multiplexed over the same time-frequency resources. The systems and methods described herein may primarily pertain to PD-NOMA, but may also apply to other variants of NOMA in some cases as well.

Turning to the figures, FIG. 1 depicts an example network 100 architecture. The example network 100 architecture may illustrate some of the components included in a network that uses PD-NOMA as described herein. The network 100 may include one or more upstream components 102 and one or more downstream components 104. The one or more upstream components 102, for example, may include remote PHY device (RPD) (for example, remote PHY device 140 and remote PHY device 142, as well as any other number of remote PHY devices and/or any other type of device) in the example shown in FIG. 1. The one or more downstream components 104 may include customer end devices, such as modems (for example, customer modem 144, customer modem 146, or any other type of customer device). In some instances, the one or more upstream components 102 and one or more downstream components 104 may be components included in the network 800 described below with respect to FIG. 8 (for example, the one or more upstream components 102 may be the remote PHY device 808 and the one or more downstream components 104 may include the customer premises equipment (CPE)). However, the one or more upstream components 102 and one or more downstream components 104 may similarly include any two or more network components that may communicate using PD-NOMA as described herein. The one or more upstream components 102 and one or more downstream components 104 may be connected by a coaxial network 106, however, the one or more upstream components 102 and one or more downstream components 104 may also be connected by any other type of physical or virtual connection as well.

In some embodiments, the one or more upstream components 102 may include at least one or more bit error rate (BER) modules (for example, BER module 108 and/or BER module 113), one or more quadrature amplitude modulation (QAM) de-mapping modules (for example, QAM de-mapping module 109 and/or QAM de-mapping module 114), one or more zero forcing (ZF) modules (for example, ZF module 110 and/or ZF module 116), one or more Fast Fourier Transform (FFT) modules (for example, FFT module 111 and/or FFT module 117), and one or more cyclic prefix (CP) removal modules 112 (for example, CP removal module 112 and/or CP removal module 118). The one or more upstream components 102 may also include one or more self-interference cancellation (SIC) modules 115. In some embodiments, the one or more upstream components 102 may also include one or more de-orthogonal circulate transform (de-OCT) modules 105 (for example, de-OCT module 148 and/or de-OCT module 150).

In some embodiments, the one or more BER modules may be used to calculate a Bit Error Rate (BER) for data being received. BER may be a measure of signal integrity based on the quantity or percentage of transmitted bits that are received incorrectly. The more bits that are received incorrectly, the greater the impact on signal quality (so a higher BER may be indicative of a poorly performing network).

In some embodiments, the one or more QAM de-mapping modules may be used to map a received QAM constellation signal into data points. QAM may be one example of a modulation scheme that may be used to transmit data between devices. In a digital modulation system, information may be transmitted as a series of samples, with each sample being transmitted at a different time slot. Individual samples may include a carrier waveform that has a constant amplitude and phase. Each sample may encode one or more "symbols," which may represent one or more binary bits of data. Each symbol may be encoded as a different combination of amplitude and phase of the carrier waveform, so each symbol is represented by a point called a constellation point. Multiple of such symbols may be transmitted simultaneously using this modulation scheme, with a combination of constellation points forming what is called a "constellation diagram." On the constellation diagram, a distance a constellation point is away from an origin may provide an indication of the amplitude of that particular point. Similarly, a distance between two constellation points on the constellation diagram may be indicative of phase shifts between the two points. The constellation diagram may show all of the possible symbols that can be transmitted by the system as a collection of points. In a frequency or phase modulated signal, the signal amplitude may be constant, so the constellation points lie on a circle around an origin of the constellation diagram. However, amplitude modulation (or other types of modulation may also be used), which may lead to different shapes of constellation diagrams. The shape and size of the constellation diagram may depend on the type of QAM being used (for example, 8QAM, 16QAM, 64QAM, 128QAM, 256QAM, or any other type of QAM). Thus, the one or more QAM de-mapping modules may be used as part of the one or more upstream components 102 (which may represent receiving devices receiving data from transmitting devices) because the upstream components 102 may receive data being transmitted using QAM. The one or more QAM de-mapping modules may receive the transmitted symbols and extract the data included in the symbols, hence "de-mapping" the information included in the constellation points in the constellation map. Although the de-mapping module is specifically described as being used for a QAM scheme herein, any other modulation scheme may similarly be employed to transmit data between devices.

In some embodiments, the one or more ZF modules may be used to perform zero force precoding, which may be a form of spatial signal processing that may remove multi-user interference. If channel state information is perfectly known at a transmitter, then the zero-forcing precoding may be provided by a Moore-Penrose pseudo-inverse of a channel matrix. The one or more FFT modules may be used to convert a received signal from the time domain back into the frequency domain (for example, by performing a FFT on the received signal). When data is transmitted between devices, the data may be transmitted in the time domain. Thus, as described below, a transmitted signal may be converted from the frequency domain to the time domain by an IFFT module before transmission, and upon receipt, the signal may be converted back from the time domain to the frequency domain. The one or more CP removal modules may be used to remove a cyclic prefix from the signal. A cyclic prefix may be created at the transmitting side to prevent intersymbol interference (ISI) when a signal is transmitted in a dispersive channel. In some cases, the cyclic prefix (CP) may be an identical copy of the last portion of the symbol appended before the symbol. This CP may preserve the orthogonality of the subcarriers and prevent ISI between successive symbols.

In some embodiments, the one or more interference cancellation (IC) modules may be used to perform self-interference cancellation on a received signal. Interference cancellation (for example, successive interference cancellation (SIC) or parallel interference cancellation (PIC), as well as any other types of interference cancellation) may be used at the receiver side to separate out combined signals including transmissions from multiple transmitter devices at multiple different power levels into the one or more transmissions associated with the transmitter that the receiver desired to receive information from. In some instances, the interference cancellation described herein may more specifically relate to minimum mean square error (MMSE) cancellation. SIC may involve decoding and removing signals associated with individual devices one at a time before decoding and obtaining signals for additional devices. PIC may involve decoding and obtaining signals for different devices simultaneously. As one general example of interference cancellation, a first customer device may transmit at a power level of 25 dB and a second customer device may transmit at a power level of 10 dB. Using PD-NOMA, these two transmissions may be performed at the same time by stacking them at different power levels in the signal transmission. At the receiver side, if the receiver wants to read the information associated with the first customer device, the interference cancellation may be used to separate out the 25 dB signal from the 10 dB signal in order to obtain the transmission from the first customer device.

In some embodiments, the one or more downstream components 104 may include at least one or more parallel to serial conversion modules (for example, P/S 119 and/or P/S 124), one or more cyclic prefix adding modules (for example, Add CP 120 and/or Add CP 125), one or more Inverse Fast Fourier Transform (IFFT) modules (for example, IFFT 121 and/or IFFT 126), one or more QAM mapping modules (for example, QAM mapping 122 and/or QAM mapping 127), and/or one or more signal to noise ratio (SNR) control modules (for example, SNR control 123 and/or SNR control 128). In some embodiments, the one or more downstream components 104 may also include one or more orthogonal circulant transform (OCT) modules (for example, OCT module 152 and/or OCT module 154).

In some embodiments, the one or more parallel to serial conversion modules may be used to perform parallel to serial conversion. The one or more parallel to serial conversion modules may be used because not all devices in the network may function entirely as parallel-only or serial-only components. The one or more cyclic prefix adding modules may add a cyclic prefix to a signal as mentioned above. The one or more IFFT modules may be used to perform an inverse FFT on the signal, which may involve converting the signal from the frequency domain to the time domain before a signal is transmitted. The one or more QAM mapping modules may involve mapping data into QAM constellations. That is, while the one or more QAM de-mapping modules associated with the receiving devices may de-map a QAM constellation map, the one or more QAM mapping modules associated with the transmitting devices may map data to be transmitted into the QAM constellation map that is transmitted to the receiving devices. The one or more SNR control modules may be used to control the ratio of the power of the signal versus the power of the noise in transmissions being made over the network. For example, SNR may be at least partially controlled by a transmit level which may be set by a CMTS or RPD.

It should be noted that any of the modules described with respect to FIG. 1 may be implemented in any of the hardware described below with respect to FIGS. 7-8. For example, any of the modules maybe be implemented in hardware including processors, memory, and any other elements described in FIGS. 7-8.

Figure 2A:
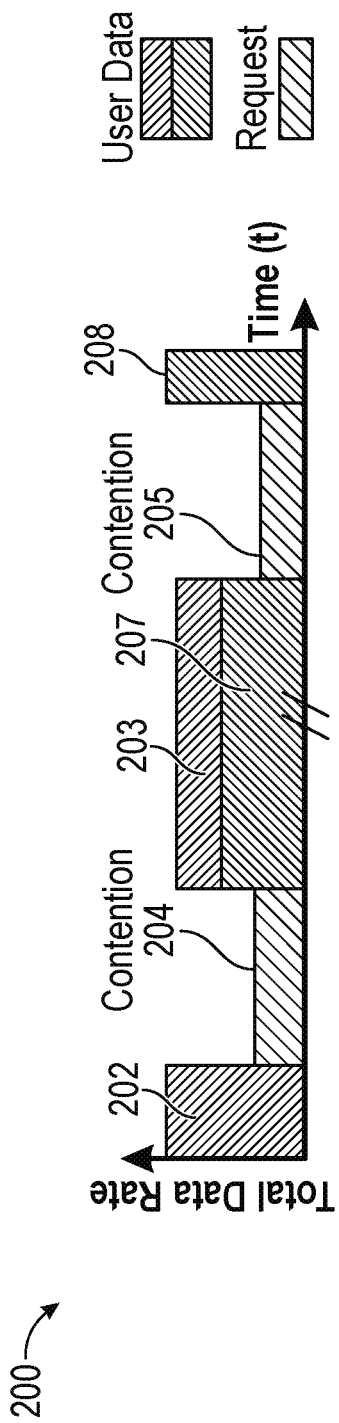
FIGS. 2A-2B depict an example uplink/downlink procedure, in accordance with one or more example embodiments of the disclosure.

FIG. 2A depicts an example diagram 200 of a conventional uplink/downlink procedure that may use one or more designated contention windows. The diagram 200 may depict one or more designated contention windows (for example, a first designated contention window 204 and/or a second designated contention window 205, as well as any other number of designated contention windows not shown in the figure). As shown in the diagram 200, each of the contention windows may take up its own designated time slot during which bandwidth requests may be made by devices, but payload requests may not be transmitted by the devices. Such contention windows may often involve the use of a back-off counter. A Back-off is a scheme that may be used during such conventional uplink/downlink procedure to resolve contention problems among different devices wishing to transmit data at the same time. When a devices goes into a back-off state, it waits an additional, randomly selected number of time slots. During this time, the device continues sensing the network to determine whether it remains free of transmissions or if another transmission begins. At the end of the time period for the device, if the network is still free the device may then transmit its data payload. If during the time frame another device begins transmitting data, the back-off counter is frozen and counting down starts again when the network returns to the idle state. The diagram 200 may also show one or more data payloads being transmitted by one or more different devices in the network. Particularly, the diagram may depict data payloads being transmitted by two different example devices at different times. For example, a first device may transmit a first data payload 202 at a first time before a first contention window 204 and may also transmit a second data payload 203 at a second time in between the first contention window 204 and the second contention window 205. A second device may transmit a third data payload 207 between the first contention window 204 and the second contention window and may also transmit a fourth data payload 208 after the second contention window 205. As depicted in the figure, the data payloads being transmitted by the two devices may only be transmitted outside of the contention windows, which may result in a reduced amount of data being transmitted being limited by the length in time of the two contention windows. Additionally, because the time slots associated with the two contention windows may be relatively short, the possibility of collisions between bandwidth requests made by the two devices during the contention windows may exist, which may further reduce the speed at which the two devices may transmit the data payloads.

Figure 2B:
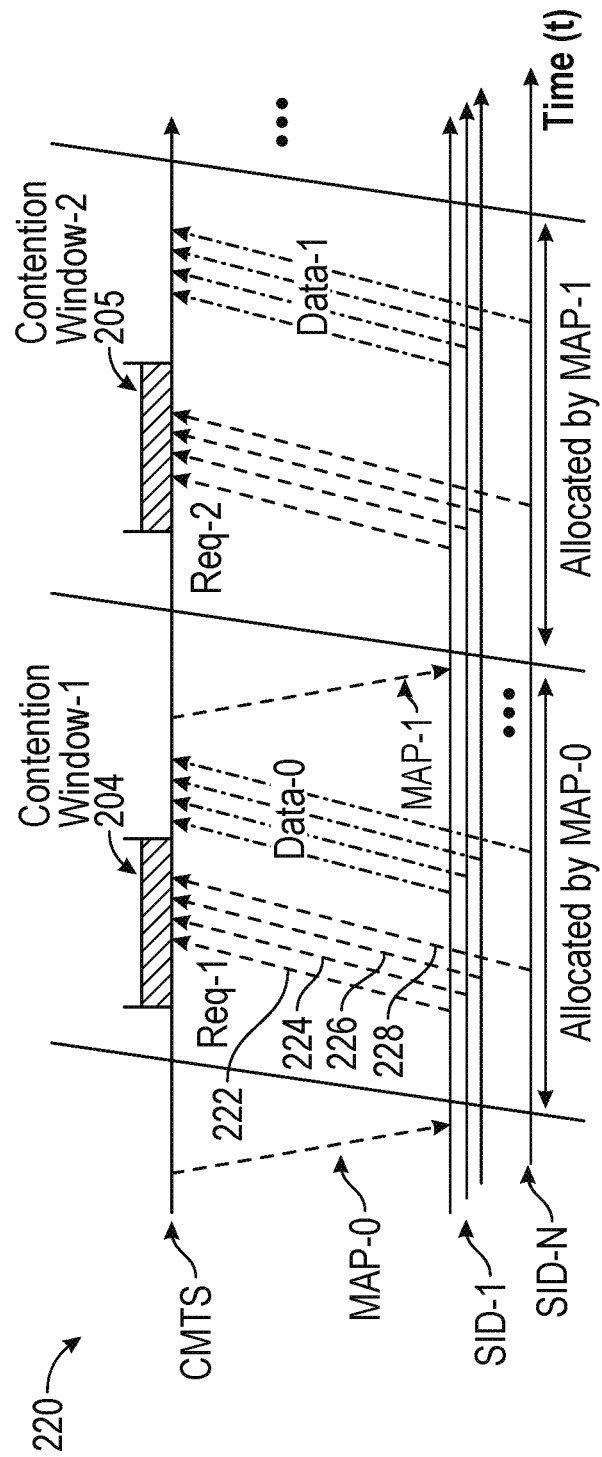

FIG. 2B depicts another example diagram 220 of the conventional uplink/downlink procedure that may use one or more designated contention windows (for example, the same contention windows and data payloads as depicted in the diagram 200, but presented in a different format showing individual bandwidth requests being made). The diagram 220 may depict the two same contention windows depicted in diagram 200 (for example, contention window 204 and contention window 205). The diagram 220 may also depict a number of different bandwidth requests being transmitted from one or more different devices during the contention windows. For example, during the contention window 204, the diagram 220 may depict four different devices transmitting four different bandwidth requests (bandwidth request 222, bandwidth request 224, bandwidth request 226, and/or bandwidth request 228). The diagram 220 may also depict that once the contention window 204 has ended, data payload transmissions may occur. This process may be repeated for any additional number of subsequent contention windows and data payload transmissions by any of the deices in the network (for example, contention window 205 and/or any other subsequent contention window).

FIG. 3A illustrates an example diagram 300 of an uplink/downlink procedure that may eliminate the need for designated contention windows (for example, designated contention windows depicted in FIGS. 2A-2B) as described herein. On the diagram 300, the x-axis may represent time and the y-axis may represent bandwidth. The diagram 300 may depict one or more data payloads being transmitted by one or more devices. For example, the diagram 300 may depict a first device transmitting a first data payload 302 at a first time, a second data payload 304 at a second time, and a third data payload 305 at a third time. A second deice may transmit a fourth data payload 303 and a fifth data payload 306 as well. However, in contrast with the diagram 200 depicted in FIG. 2, the contention window 307 used in this PD-NOMA scheme may exist in the same portion of the time domain as the data payloads being transmitted by the two devices. That is, bandwidth request 308, bandwidth request 309, and bandwidth request 310 (as well as any other number of bandwidth requests blocks that may exist) may be transmitted at the same time as the data payloads being transmitted by the two devices. These bandwidth requests may be transmitted by the same two devices transmitting the data payloads depicted in the figure or may also be bandwidth requests by any other devices in the network as well. Consequentially, the uplink/downlink procedure depicted in diagram 300 may allow for the designated contention windows (for example, the one or more contention windows depicted in FIG. 2) to be eliminated. In this context, reference to "eliminating" the contention window may not mean that uplink and/or downlink bandwidth requests are no longer made, but may rather refer to the fact that the contention window may not take up its own separate block in the time and/or frequency domain. Rather, the uplink and/or downlink bandwidth requests may be made in the same time and/or frequency blocks as other data transmissions being performed by the devices, but at different power levels using the PD-NOMA scheme described herein. In this regard, the contention window may actually be made "infinite" (for example, as shown by the contention window 304 in FIGS. 3A and also 3B) in that uplink and/or downlink bandwidth requests may be made at any time, even if other data transmissions are also being made during the same time and/or frequency blocks.

Figure 3C:
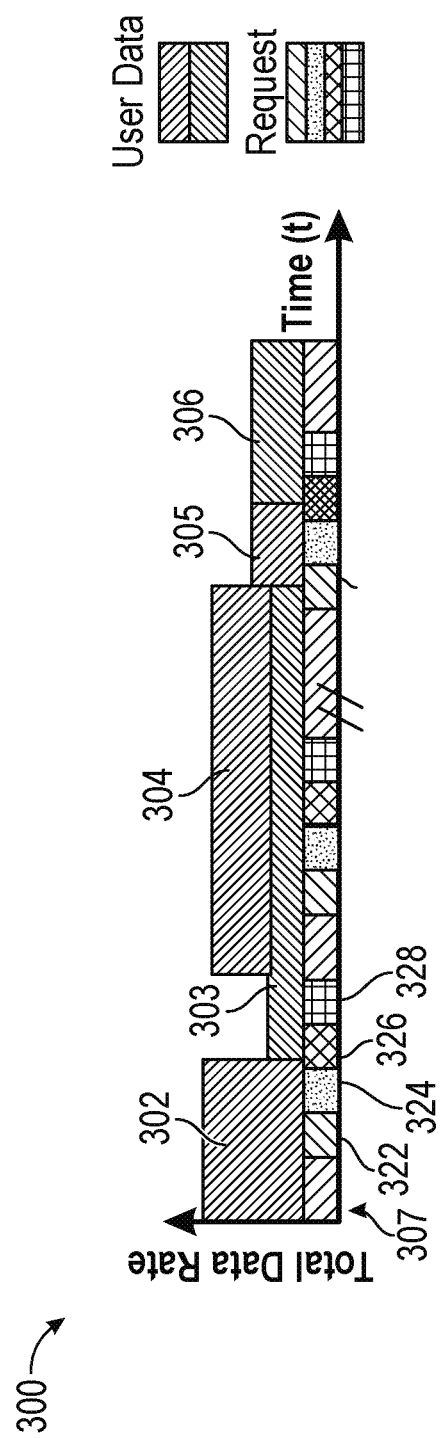

FIG. 3B illustrates another example diagram 320 of the conventional uplink/downlink procedure that may use one or more designated contention windows (for example, the same contention windows and data payloads as depicted in the diagram 300 but presented in a different format showing individual bandwidth requests being made). The diagram 320 may depict the same continuous contention window depicted in diagram 300 (for example, contention window 307). The diagram 320 may also depict a number of different bandwidth requests being transmitted from one or more different devices during the contention window 307. For example, the diagram 320 may depict four different devices transmitting four different bandwidth requests (bandwidth request 322, bandwidth request 324, bandwidth request 326, and/or bandwidth request 328). These four bandwidth requests may also be depicted as bandwidth request 332, bandwidth request 334, bandwidth request 336, and bandwidth request 338 in FIG. 3C. The diagram 220 may also depict that the four subsequent bandwidth requests that were made during the second contention window 205 in FIG. 2 are made during the same continuous contention window 307 in FIG. 3B. That is, FIG. 3B may also depict that the need for designated contention windows may be eliminated. Additionally, FIG. 3B may also illustrate that the timing between bandwidth requests may be more spaced out than the timing between bandwidth requests in the shortened designated contention windows depicted in FIG. 2. As described above, this may reduce the likelihood that the different bandwidth requests result in collisions that may require re-transmission of the requests involved in the collision.

As illustrated by FIGS. 3A-3C, eliminating the designated contention window time slot may provide a number of benefits. A first benefit may be that bandwidth requests may now be made in conjunction with data transmissions, so devices may not need to wait for a subsequent contention window to make an uplink and/or downlink bandwidth request, and one or more devices may make bandwidth requests at any given time. This may improve network efficiency as bandwidth requests may be made at a faster rate than if devices were required to wait for designated contention window time slots to make bandwidth requests. Additionally, the use of the contention window 304 that may be merged with the data transmission block 302 timeslots may also reduce the likelihood that collisions may occur between requests from multiple devices taking place within a much shorter contention window (for example, the designated contention window 202 depicted in FIG. 2).

Figures 4A, 4B:
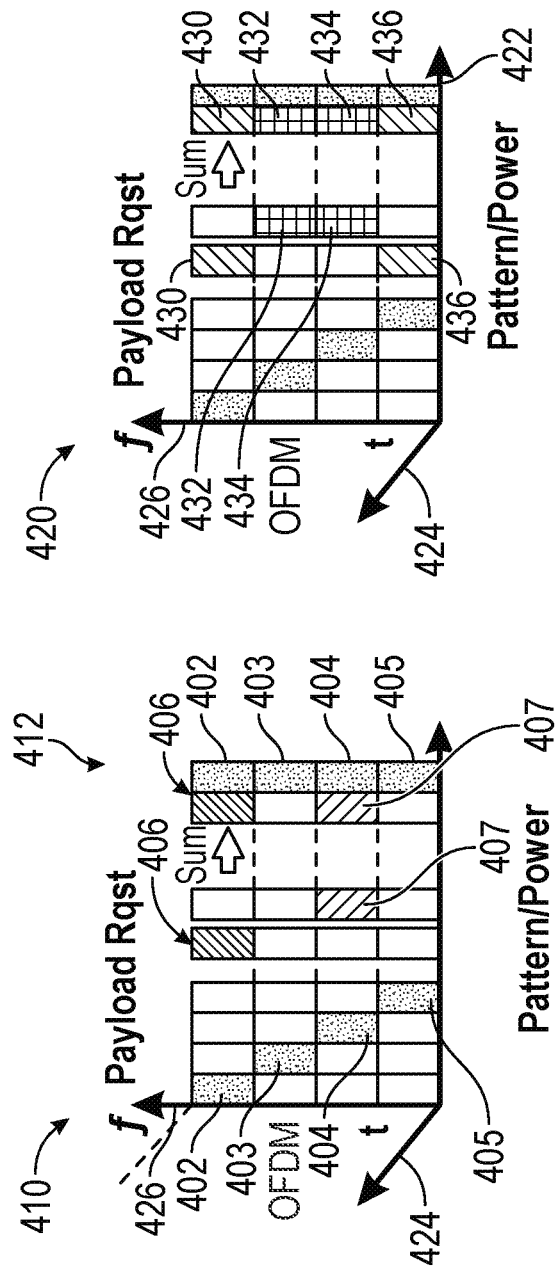
FIGS. 4A-4B depict example transmissions at varying power levels, in accordance with one or more example embodiments of the disclosure.

FIGS. 4A-4B depict example resource blocks including data payloads and/or bandwidth requests. In the resource blocks (for example, resource block 410 depicted in FIG. 4A and resource block 420 depicted in FIG. 4B), a first axis 424 may represent time, a second axis 426 may represent frequency, and a third axis 422 may represent power. FIG. 4A depicts a first example of a resource block 410 including one or more data payloads (for example, data payload 402, data payload 403, data payload 404, and/or data payload 405).

The example resource block 410 may also include one or more bandwidth requests (for example, bandwidth request 406 and/or bandwidth request 407). As depicted in the figure, the data payloads may be at different power levels than the bandwidth requests. Additionally, individual data payloads may be at different power levels than one another and individual bandwidth requests may be at different power levels than one another as well. Summed resource block 412 may illustrate that as groupings, the data payloads as a group and the bandwidth requests as a group may be at different power levels, but this may not necessarily mean that all the data payloads are at the same power level and all the bandwidth requests are at the same power level. FIG. 4B may illustrate another example resource block 420 that may include a different combination of bandwidth requests (for example, bandwidth request 430, bandwidth request 432, bandwidth request 434, and bandwidth request 436). However, any other combination of data payloads and/or bandwidth requests in any combination of times, frequencies, and or power levels may also be applicable.

FIGS. 5A-5B depict example data transmission resource blocks illustrating collision avoidance. FIG. 5A may depict an example of a resource block 501 including one or more collisions between bandwidth requests from two different devices. For example, the resource block 501 may illustrate a resource element 502 including bandwidth requests from two different devices and a resource element 504 including bandwidth requests from two different devices. The bandwidth requests in the resource element 502 and the resource element 504 may be in the same timeslot, at the same frequency, and/or at the same power level, thus resulting in the collision. In such cases, the bandwidth requests by the two devices may need to be re-transmitted.

In contrast to FIG. 5A, FIG. 5B may depict another benefit of the use of PD-NOMA for purposes of eliminating the designated contention window. This additional benefit may be that bandwidth requests from different devices may be transmitted at different power levels to further reduce the likelihood of collisions between different bandwidth requests. For example, instead of two bandwidth requests being transmitted at the same power level, as is the case in both the resource element 502 and the resource element 504 in FIG. 5A, the bandwidth requests may be transmitted at different power levels. For example, two of the bandwidth requests (bandwidth request 506 and bandwidth request 512) may be transmitted at a first power level and two of the bandwidth requests (bandwidth request 508 and bandwidth request 510) may be transmitted at a second power level. This may reduce the likelihood that any of the bandwidth requests collide with one another during transmission.

In some embodiments, the specific application of PD-NOMA in DOCSIS networks in particular may reduce the likelihood of collisions in the manner described above with respect to FIGS. 5A-5B as signal transmission power levels from different customer devices in a DOCSIS network may be based on properties of the tap devices (and other devices) in the network, rather than the transmission power levels being actively controlled by a centralized management system. For example the tap devices may be associated with unique signal attenuation values (in some instances, refer to a "power level" of a tap may also refer to this signal attenuation of the tap as well) that may decide the amount of signal that is "dropped off" to customer devices and subtracted from an output signal of the tap device. With respect to a DOCSIS network in particular, groups of customer devices may be connected to different tap devices on a network. For example, a first group of five customer devices may be connected to a first network tap, a second group of six customer devices may be connected to a second network tap, and so on (these are just examples of numbers of devices that may be connected to a given tap, and any other number of devices may also be connected to a tap as well). These tap devices may be inserted into locations on a network and may be used to split or copy packets from the network for creating additional customer service access points. A tap may also be associated with a split ratio, which may be indicative of a percentage of signal received by the tap that is passed through the tap and downstream the network versus a percentage of signal that is split off for creating additional network terminations. The customer devices connected to the different taps may operate at different power levels. That is, individual network taps may attenuate a signal received from an upstream portion of the network down to a particular power level based on the properties of the individual tap. This attenuated signal may then be output by the tap downstream the network to additional tap devices and their associated customer devices. The closer a network tap is to an upstream signal origination point on the network, the higher the signal power level may be provided to the customer devices associated with that tap. As one non-limiting example, a network may include three tap devices each serving five customer devices. A signal may be sent downstream to a first tap device of the three tap devices at a signal power level of 50 dB. If the attenuation associated with the first tap device is 25 dB, then 25 dB of the input 50 dB signal may be provided to the customer devices. Consequentially, the signal output of the first tap may be the input signal power level of 50 dB subtracted by the attenuation of the first tap of 25 dB (so the power level of the signal output from the first tap to the second tap in the network may be 25 dB). Continuing the same example, the second tap device may have an associated attenuation of 10 dB, for example. The second tap device may receive the output signal at 25 dB from the first tap device and provide 10 dB of this signal to the customer devices associated with the second tap device. The second tap may then provide an attenuated output signal of 15 dB (25 dB input subtracted by the 10 dB power level) to the third tap.

Figure 6:
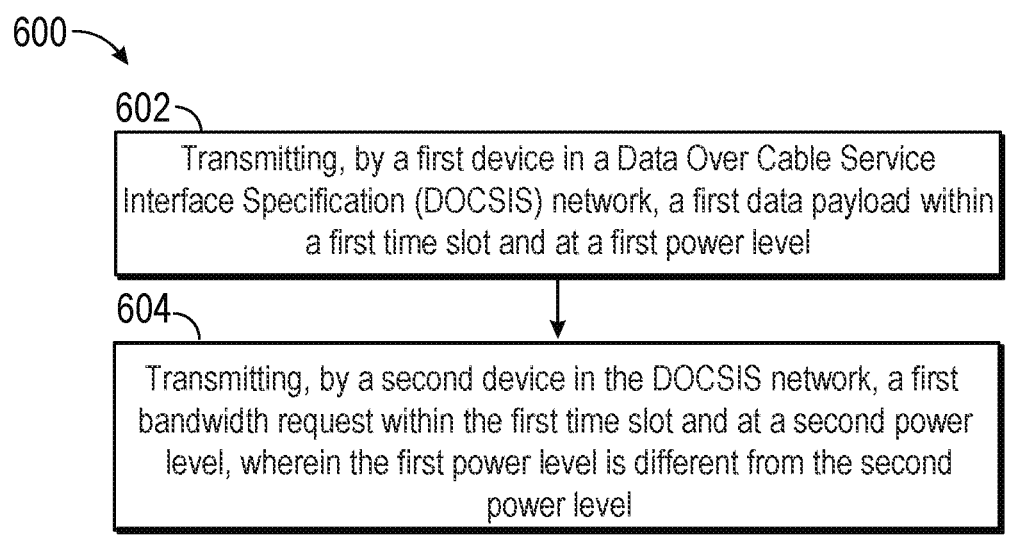
FIG. 6 depicts a flowchart of an example method, in accordance with one or more example embodiments of the disclosure.

FIG. 6 is an example method 600. At block 602 of the method 600 in FIG. 6, the method may include transmitting, by a first device in a Data Over Cable Service Interface Specification (DOCSIS) network, a first data payload within a first time slot and at a first power level. Block 604 of the method 600 may include transmitting, by a second device in the DOCSIS network, a first bandwidth request within the first time slot and at a second power level.

In some embodiments, the method 600 may also include transmitting, by the first device or the second device, a second data payload within a second time slot and at the first power level. The method may also include transmitting, by a third device in the DOCSIS network, a second bandwidth request within the second time slot and at the second power level. The method 600 may also include transmitting, by a third device in the DOCSIS network, a second bandwidth request within the first time slot and at a third power level. In some embodiments, transmitting the first bandwidth request at the second power level is based on an attenuation level of a tap device upstream from the second device. In some embodiments, transmitting the first bandwidth request is performed without using a backoff period. In some embodiments, the second power level comprises a contention window, and wherein the first bandwidth request comprises a request by the second device to schedule a transmission of a second data payload from the second device at a subsequent time. In some embodiments, the first data payload and first bandwidth request are transmitted using a Power Domain Non-Orthogonal Multiple Access (PD-NOMA) scheme.

The operations described and depicted in the illustrative process flows of FIG. 6 may be carried out or performed in any suitable order as desired in various example embodiments of the disclosure. The operations described and depicted in the illustrative process flows of FIG. 6 may be carried out or performed by any devices described herein, such as the management computing entity 700 described with respect to FIG. 7, as well as any other device described herein. Additionally, in certain example embodiments, at least a portion of the operations may be carried out in parallel. Furthermore, in certain example embodiments, less, more, or different operations than those depicted in FIG. 6 may be performed.

One or more operations of the process flows of FIG. 6 may have been described above as being performed by a user device, or more specifically, by one or more program modules, applications, or the like executing on a device. It should be appreciated, however, that any of the operations of process flows of FIG. 6 may be performed, at least in part, in a distributed manner by one or more other devices, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the process flows of FIG. 6 may be described in the context of the illustrative vehicle transaction platform, it should be appreciated that such operations may be implemented in connection with numerous other device configurations.

Figure 7:
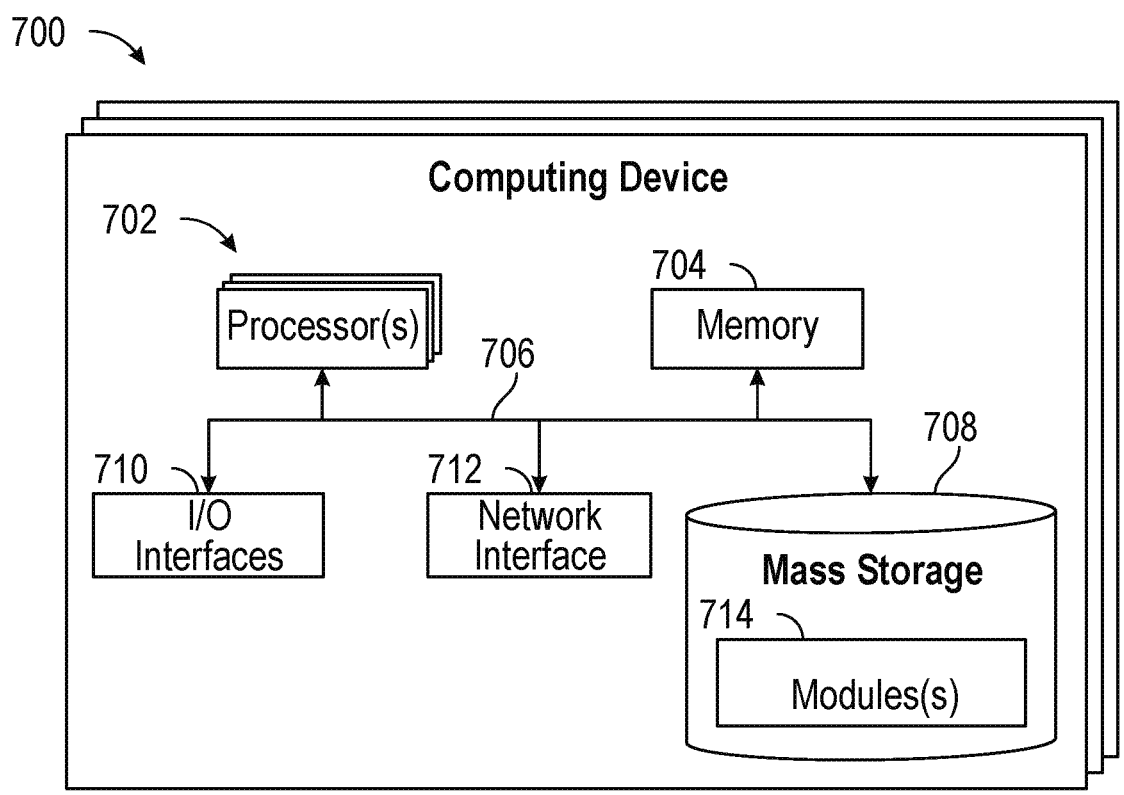
FIG. 7 depicts an example computing entity, in accordance with one or more example embodiments of the disclosure.

FIG. 7 illustrates an example computing device 700, in accordance with one or more embodiments of this disclosure. The computing device 700 may be a device used to perform any of the processing with respect to the flare artifact score determination or any other processing described herein. The computing device 700 may include at least one processor 702 that executes instructions that are stored in one or more memory devices (referred to as memory 704). The instructions can be, for instance, instructions for implementing functionality described as being carried out by one or more modules and systems disclosed above or instructions for implementing one or more of the methods disclosed above. The processor(s) 702 can be embodied in, for example, a CPU, multiple CPUs, a GPU, multiple GPUs, a TPU, multiple TPUs, a multi-core processor, a combination thereof, and the like. In some embodiments, the processor(s) 702 can be arranged in a single processing device. In other embodiments, the processor(s) 702 can be distributed across two or more processing devices (e.g., multiple CPUs; multiple GPUs; a combination thereof; or the like). A processor can be implemented as a combination of processing circuitry or computing processing units (such as CPUs, GPUs, or a combination of both). Therefore, for the sake of illustration, a processor can refer to a single-core processor; a single processor with software multithread execution capability; a multi core processor; a multi core processor with software multithread execution capability; a multi core processor with hardware multithread technology; a parallel processing (or computing) platform; and parallel computing platforms with distributed shared memory. Additionally, or as another example, a processor can refer to an integrated circuit (IC), an ASIC, a digital signal processor (DSP), a FPGA, a PLC, a complex programmable logic device (CPLD), a discrete gate or transistor logic, discrete hardware components, or any combination thereof designed or otherwise configured (e.g., manufactured) to perform the functions described herein.

The processor(s) 702 can access the memory 704 by means of a communication architecture 706 (e.g., a system bus). The communication architecture 706 may be suitable for the particular arrangement (localized or distributed) and type of the processor(s) 702. In some embodiments, the communication architecture 706 can include one or many bus architectures, such as a memory bus or a memory controller; a peripheral bus; an accelerated graphics port; a processor or local bus; a combination thereof; or the like. As an illustration, such architectures can include an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCMCIA) bus, a Universal Serial Bus (USB), and or the like.

Memory components or memory devices disclosed herein can be embodied in either volatile memory or non-volatile memory or can include both volatile and non-volatile memory. In addition, the memory components or memory devices can be removable or non removable, and/or internal or external to a computing device or component. Examples of various types of non-transitory storage media can include hard-disc drives, zip drives, CD-ROMs, digital versatile discs (DVDs) or other optical storage, magnetic cassettes, magnetic tape, magnetic disk storage or other magnetic storage devices, flash memory cards or other types of memory cards, cartridges, or any other non-transitory media suitable to retain the desired information and which can be accessed by a computing device.

As an illustration, non volatile memory can include read-only memory (ROM), programmable ROM (PROM), electrically programmable ROM (EPROM), electrically erasable programmable ROM (EEPROM), or flash memory. Volatile memory can include random-access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory devices or memories of the operational or computational environments described herein are intended to include one or more of these and/or any other suitable types of memory. In addition to storing executable instructions, the memory 704 also can retain data.

Each computing device 700 also can include mass storage 708 that is accessible by the processor(s) 702 by means of the communication architecture 706. The mass storage 708 can include machine-accessible instructions (e.g., computer-readable instructions and/or computer-executable instructions). In some embodiments, the machine-accessible instructions may be encoded in the mass storage 708 and can be arranged in components that can be built (e.g., linked and compiled) and retained in computer-executable form in the mass storage 708 or in one or more other machine-accessible non-transitory storage media included in the computing device 700. Such components can embody, or can constitute, one or many of the various modules disclosed herein. Such modules are illustrated as modules 714.

Execution of the modules 714, individually or in combination, by at least one of the processor(s) 702, can cause the computing device 700 to perform any of the operations described herein (for example, the operations described with respect to FIG. 6, as well as any other operations).

Each computing device 700 also can include one or more input/output interface devices 710 (referred to as I/O interface 710) that can permit or otherwise facilitate external devices to communicate with the computing device 700. For instance, the I/O interface 710 may be used to receive and send data and/or instructions from and to an external computing device. The computing device 700 also includes one or more network interface devices 712 (referred to as network interface(s) 712) that can permit or otherwise facilitate functionally coupling the computing device 700 with one or more external devices. Functionally coupling the computing device 700 to an external device can include establishing a wireline connection or a wireless connection between the computing device 700 and the external device. The network interface devices 712 can include one or many antennas and a communication processing device that can permit wireless communications. Such a communication processing device can process data according to defined protocols of one or several radio technologies. The radio technologies can include, for example, 3G, Long Term Evolution (LTE), LTE-Advanced, 5G, IEEE 802.11, IEEE 802.16, Bluetooth, ZigBee, near-field communication (NFC), and the like.

As used in this application, the terms "environment," "system," "unit," "module," "architecture," "interface," "component," and the like refer to a computer-related entity or an entity related to an operational apparatus with one or more defined functionalities. The terms "environment," "system," "module," "component," "architecture," "interface," and "unit," can be utilized interchangeably and can be generically referred to functional elements. Such entities may be either hardware, a combination of hardware and software, software, or software in execution. As an example, a module can be embodied in a process running on a processor, a processor, an object, an executable portion of software, a thread of execution, a program, and/or a computing device. As another example, both a software application executing on a computing device and the computing device can embody a module. As yet another example, one or more modules may reside within a process and/or thread of execution. A module may be localized on one computing device or distributed between two or more computing devices. As is disclosed herein, a module can execute from various computer-readable non-transitory storage media having various data structures stored thereon. Modules can communicate via local and/or remote processes in accordance, for example, with a signal (either analogic or digital) having one or more data packets (e.g., data from one component interacting with another component in a local system, distributed system, and/or across a network such as a wide area network with other systems via the signal).

As yet another example, a module can be embodied in or can include an apparatus with a defined functionality provided by mechanical parts operated by electric or electronic circuitry that is controlled by a software application or firmware application executed by a processor. Such a processor can be internal or external to the apparatus and can execute at least part of the software or firmware application. Still in another example, a module can be embodied in or can include an apparatus that provides defined functionality through electronic components without mechanical parts. The electronic components can include a processor to execute software or firmware that permits or otherwise facilitates, at least in part, the functionality of the electronic components.

In some embodiments, modules can communicate via local and/or remote processes in accordance, for example, with a signal (either analog or digital) having one or more data packets (e.g., data from one component interacting with another component in a local system, distributed system, and/or across a network such as a wide area network with other systems via the signal). In addition, or in other embodiments, modules can communicate or otherwise be coupled via thermal, mechanical, electrical, and/or electro-mechanical coupling mechanisms (such as conduits, connectors, combinations thereof, or the like). An interface can include input/output (I/O) components as well as associated processors, applications, and/or other programming components.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any methods or technology for storage of information, such as machine-accessible instructions (e.g., computer-readable instructions), information structures, program modules, or other information objects.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, techniques, and computer program products that, individually and in combination, permit the automated provision of an update for a vehicle profile package. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

Figure 8:
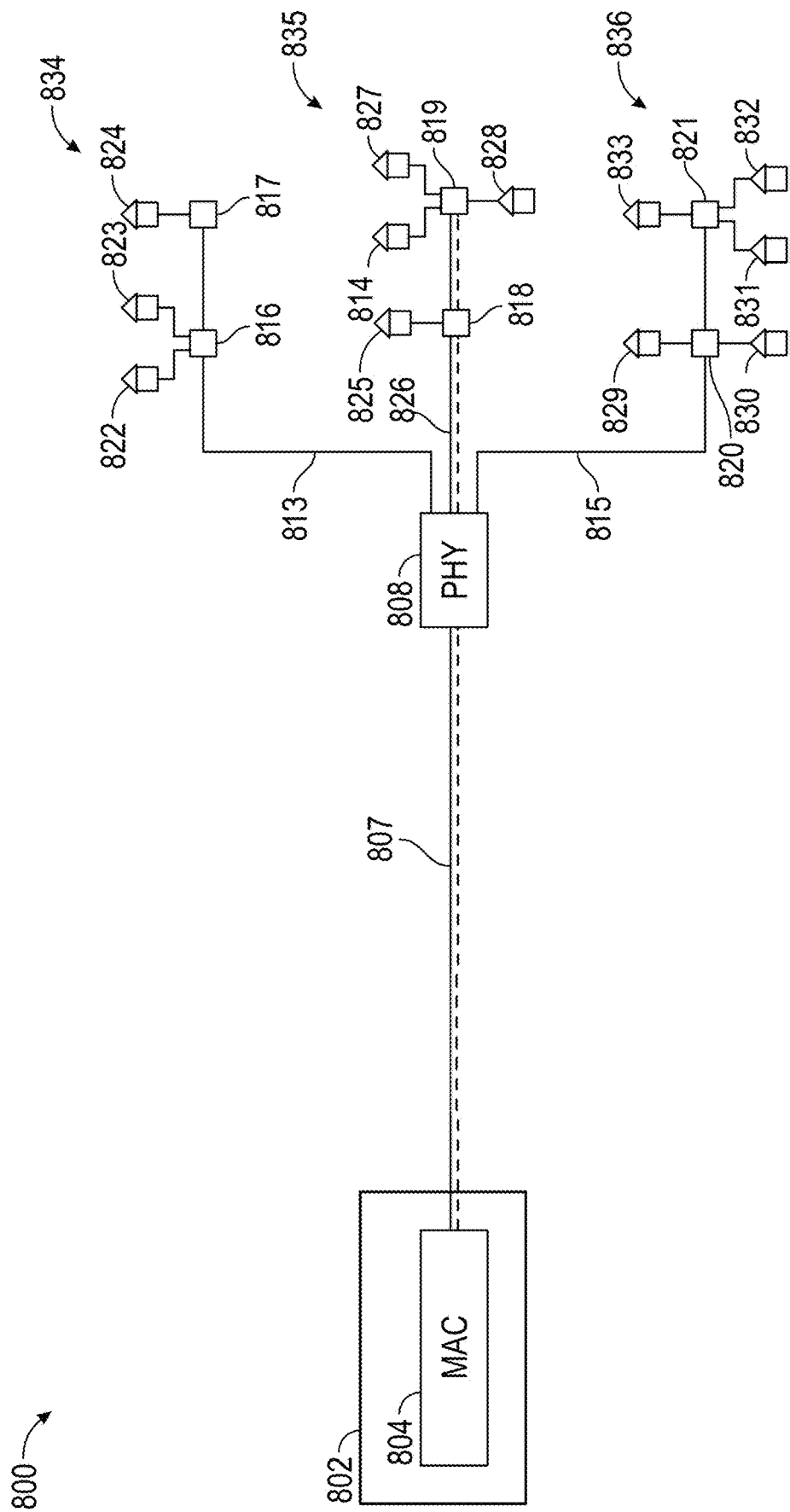
FIG. 8 depicts an example network architecture, in accordance with one or more example embodiments of the disclosure.

FIG. 8 depicts an example network 800 architecture, in accordance with one or more example embodiments of the disclosure. In particular, the network 800 depicted in FIG. 8 may include may include a single MAC controller 804. The MAC controller may be located within a headend 802, for example, but may similarly be located in any other part of the network 800. The network 800 may separate out the functionality of a CMTS into a MAC layer device (for example, the MAC controller 804) and a PHY layer device 808, as may be described in further detail below. Networks, such as network 800, making use of remote PHY devices 808 may use at least two different methods of transmitting data packets. In a first method depicted in network 800, a hardware-based MAC layer device 804 (the terms "MAC layer device" and "MAC controller" may be used interchangeably herein) may receive incoming data packets and may transmit the data packets to a remote PHY device 808 over fiber 807 (for example, digital fiber). In some embodiment, the data packets may be transmitted to another device (for example, a customer premise equipment) using the remote PHY device 808. In particular, the data packets can be transmitted from the remote PHY device 808 on coaxial fiber (for example coaxial fiber on leg 813, leg 814, and/or leg 815 of the PHY device 808) to a customer (for example, to a customer's premise equipment (CPE), such as a cable modem). Additionally, one or more amplifiers (not shown in the figure) may be used to prevent the attenuation of the signal.

As noted, in some embodiments, networks making use of remote PHY devices 808 may use at least two different methods of transmitting data packets, the first method of which was described above. A second method to transmit data packets on the network may involve performing aspects of the above transmission in software (for example, in a cloud computing environment). In such a case, the MAC layer 802 functionality may be software-implemented (for example, in the cloud), and such functionality may be referred to as a virtual MAC (VMAC) layer 804. Accordingly, as packets are received (for example, from another device such as a headend) and processed by the VMAC 804, the data packets may then be transmitted out (for example, using Ethernet switches, hubs, routers, and the like) to the remote PHY device 808 over fiber 807 (for example, digital fiber). From the remote PHY device 808 the data packets may be transmitted over coaxial cables (for example coaxial fiber on leg 813, leg 814, and leg 815 of the PHY device 808) to a customer using one or more amplifiers (not shown in the figure) to reduce the attenuation of the signal. For example, the data packets may be transmitted to a customer's premise equipment (CPE) (for example, CPEs 814-836, as well as any other number of CPEs), such as a cable modem. It should be noted that although reference is made herein to certain portion of the network using fiber cables and certain portions using coaxial cables, these same portions may also include any other type of transmission cable as well.

In some embodiments, a cable modem termination system (CMTS) may include devices that represent layer-1, layer-2, and/or any other layer functionality of the Open Systems Interconnection (OSI) model used in connection with cable networks. In some embodiments, devices that represent the layer-1, layer-2, and/or any other layer functionality may have a system architecture wherein all the devices are placed in one chassis, that is, in one chassis in one geographical location. In another embodiment, in a remote PHY topology, the layer-1 and/or layer-2 devices can exist in a different chassis that may be distributed throughout the network 100. In some embodiments, the various layer-1 and/or layer 2 devices in the distributed architecture described herein can communicate with one another using an Ethernet-based protocol. In another embodiment, the various devices (that is the layer-1 and/or layer-2 devices) can communicate using a downstream external PHY interface (DEPI) protocol, for example, between a layer-2 device to a layer-1 device. In another embodiment, the DEPI protocol can be used between devices that both have MAC functionality. In some embodiments, the various devices can use an upstream external PHY interface (UEPI) protocol to communicate between devices of different layer types, for example, between devices having MAC functionality.

In some embodiments, the different layer devices (for example layer-1 and/or layer-2 devices) can communicate using a tunneling protocol and/or method, such as, a layer-2 virtual private network (VPN) tunnel, a generic router encapsulation (GRE), and/or a pseudowire. In some embodiments, the pseudowire can refer to an emulation of a point-to-point connection over a network. In some embodiments, the pseudowire can be used to transport frames (for example, DOCSIS frames), over a cable network. In some embodiments, the pseudowire can use a layer two tunneling protocol (L2TP) underlying protocol. In another embodiment, the pseudowire and/or tunnel can use an internet telephony (IP) protocol, such as IPv6 and/or IPv4.

In some embodiments, the DEPI protocol, the UEPI protocol, and/or a generic control plane (GCP) protocol can control aspects of the delivery of Data Over Cable Service Interface Specification (DOCSIS) frames between devices. In some embodiments, DEPI can represent a pseudowire that can connect frames (such as DOCSIS downstream MAC frames) from device from one layer (such as a layer-2 device), to a device from a different layer (for example, a layer-1 device). In some embodiments the devices from the different layers can be provided in separate locations. In some embodiments, the different layer devices can be connected using a common timing source. In some embodiments, the DEPI protocol, the UEPI protocol, and/or the GCP protocol used by the different layer devices (for example layer-1 and/or layer-2 devices) can be used to set up a session and tear down a session between the different layer devices.

In some embodiments, as used herein, the physical (PHY) layer may represent a fundamental layer in the OSI stack underlying the logical data structures of higher-level functions (for example, the MAC layer) in a network. For example, the PHY layer may refer to layer-1 of the OSI stack. A PHY layer device may only include layer-1 functionality or may also include a combination of any number of functionalities of any of the layers of the OSI stack. The physical layer can define the means of transmitting raw bits rather than logical data packets over a physical link connecting network nodes. The bit stream may be grouped into code words or symbols and may be converted to a physical signal that is transmitted over a hardware transmission medium (e.g., coaxial cable). The physical layer may provide an electrical and procedural interface to the transmission medium. The physical layer may include the shapes and properties of the electrical connectors, the frequencies to broadcast on, the modulation scheme to use and the like. In some instances, any of the PHY devices herein may only include PHY functionality and may not include any other OSI stack functionality. However, in some embodiments, the PHY devices may include other layer functionality of the OSI stack as well, such as MAC layer functionality, or any other functionality.

In some embodiments, the MAC layer may represent a fundamental layer in the OSI stack that may provide addressing and/or channel access control mechanisms that can allow several terminals or network nodes to communicate within a multiple access network that incorporates a shared medium, for example an Ethernet, cable, telecommunications, wireless, or other type of network. For example, the MAC layer may refer to layer-2 of the OSI stack. A MAC layer device may only include layer-2 functionality, or may also include a combination of any number of functionalities of any of the layers of the OSI stack. In some embodiments, the MAC layer can act as an interface and/or intermediary layer between the application layer and the network's physical layer. In some embodiments, the MAC layer can emulate a full-duplex logical communication channel in a multi-point network. Multipoint networks can include, but not be limited to, wireless Internet and IP telephony networks, for example, using gigahertz radio frequencies. This channel may provide unicast, multicast or broadcast communication service. Further some functions performed by the MAC layer can include frame delimiting and recognition, addressing of destination network nodes (both as individual nodes and as groups of nodes), conveying of addressing information, protecting against errors, for example by generating and/or checking frame check sequences, and controlling access to the physical transmission medium. The MAC layer can be implemented by numerous devices, including, but not limited to, a cable modem termination system (CMTS), an optical line termination (OLT), or a wireless access point (WAP), and the like. In various embodiments, layer-2 devices (for example the MAC layer devices) can perform mapping operations. For example, the layer-2 devices (for example the MAC layer devices) can associate a service flow identifier to a data group and/or a service group, for example, as a part of a bonding group.

In some examples, the functionality of one or more layers (for example, layer-1 and layer 2, as well as any other layers) may be combined. In some embodiments described herein the functionality of the layer-1 and the functionality of layer-2 may be performed by separate devices, (for example, split MAC/PHY devices). In another embodiment described herein the functionality of the layer-1 and the functionality of layer-2 may be incorporated into separate devices, to create a fully distributable set of devices. Further, layer-2 functionality (for example a CMTS and/or an OLT functionality for wireless access point (WAP) functionality) can be provided by a separated module/device. Moreover, layer-1 (the PHY layer) can be provided by a separated module/device.

In some embodiments, the various devices incorporating different layer functionality can be separated geographically. For example, a layer-2 device may be placed at a predetermined distance away from a layer-1 device. In some examples, the distance may be one mile, 10 miles, 100 miles, and/or the like. The layer-2 device can communicate (for example serialize and/or send data frames and/or packets) with the layer-1 device. For example, the layer-2 device can use one or more lookup tables, the lookup tables having information including, but not limited to, topology information, bridging information, and/or layer-2 device (for example MAC 2, Cable Modem 2, and/or wireless device) information (for example identification information, bandwidth capability information, location information, and the like). In some embodiments, the layer-2 device can perform global service flow classification and/or basic service flow. The layer-2 device may have source address verification (SAV) policing. In various embodiments, the layer-1 device can perform one or more of the classification routines that can be performed in the MAC layer.

It should be noted that although the description above may refer only to layer-1 and/or layer-2 devices this may only be for exemplification purposes, and any other devices including functionality of any combination of layers in the OSI stack may similarly be applicable.

In various aspects, the MAC device 804 and/or the remote PHY device 808 may include aspects of the functionality of the computing entity 700, as shown and described in connection with FIG. 7 above. In particular, the MAC device 804 and/or the remote PHY device 808 may include or be in communication with one or more processing(s) 702, memory 704, etc.

That which is claimed is:

1. A system comprising:
   a first device in a Data Over Cable Service Interface Specification (DOCSIS) network configured to transmit a first data payload within a first time slot and at a first power level; and
   a second device in the DOCSIS network configured to transmit a first bandwidth request within the first time slot and at a second power level, wherein the first power level is different from the second power level, wherein the first device or the second device is further configured to transmit a second data payload within a second time slot and at the first power level.

2. The system of claim 1, wherein the system further comprises a third device in the DOCSIS network configured to transmit a second bandwidth request within the second time slot and at the second power level.

3. The system of claim 1, further comprising a third device in the DOCSIS network configured to transmit a second bandwidth request within the first time slot and at a third power level.

4. The system of claim 1, wherein the first bandwidth request at the second power level is based on an attenuation level of a tap device upstream from the second device.

5. The system of claim 1, wherein the first bandwidth request is performed without using a backoff period.

6. The system of claim 1, wherein the second power level comprises a contention window, and wherein the first bandwidth request comprises a request by the second device to schedule a transmission of a second data payload from the second device at a subsequent time.

7. The system of claim 1, wherein the first data payload and first bandwidth request are transmitted using a Power Domain Non-Orthogonal Multiple Access (PD-NOMA) scheme.

8. A method, comprising:
   transmitting, by a first device in a Data Over Cable Service Interface Specification (DOCSIS) network, a first data payload within a first time slot and at a first power level;
   transmitting, by a second device in the DOCSIS network, a first bandwidth request within the first time slot and at a second power level; and
   transmitting, by the first device or the second device, a second data payload within a second time slot and at the first power level.

9. The method of claim 8, further comprising:
transmitting, by a third device in the DOCSIS network, a second bandwidth request within the second time slot and at the second power level.

10. The method of claim 8, further comprising:
transmitting, by a third device in the DOCSIS network, a second bandwidth request within the first time slot and at a third power level.

11. The method of claim 8, wherein transmitting the first bandwidth request at the second power level is based on an attenuation level of a tap device upstream from the second device.

12. The method of claim 8, wherein transmitting the first bandwidth request is performed without using a backoff period.

13. The method of claim 8, wherein the second power level comprises a contention window, and wherein the first bandwidth request comprises a request by the second device to schedule a transmission of a second data payload from the second device at a subsequent time.

14. The method of claim 8, wherein the first data payload and first bandwidth request are transmitted using a Power Domain Non-Orthogonal Multiple Access (PD-NOMA) scheme.

15. A non-transitory computer-readable medium storing computer-executable instructions, that when executed by at least one processor, cause the at least one processor to perform operations of:
transmitting, by a first device in a Data Over Cable Service Interface Specification (DOCSIS) network, a first data payload within a first time slot and at a first power level; and
transmitting, by a second device in the DOCSIS network, a first bandwidth request within the first time slot and at a second power level without using a distinct contention window in a different time slot; and
transmitting, by the first device or the second device, a second data payload within a second time slot and at the first power level.

16. The non-transitory computer-readable medium of claim 15, wherein the computer-executable instructions further cause the at least one processor to perform operations of:
transmitting, by a third device in the DOCSIS network, a second bandwidth request within the second time slot and at the second power level.

17. The non-transitory computer-readable medium of claim 15, wherein the computer-executable instructions further cause the at least one processor to perform operations of:
transmitting, by a third device in the DOCSIS network, a second bandwidth request within the first time slot and at a third power level.

18. The non-transitory computer-readable medium of claim 15, wherein transmitting the first bandwidth request at the second power level is based on an attenuation level of a tap device upstream from the second device.

19. The non-transitory computer-readable medium of claim 15, wherein the second power level comprises a contention window, and wherein the first bandwidth request comprises a request by the second device to schedule a transmission of a second data payload from the second device at a subsequent time.

20. The non-transitory computer-readable medium of claim 15, wherein the first data payload and first bandwidth request are transmitted using a Power Domain Non-Orthogonal Multiple Access (PD-NOMA) scheme, and wherein the first data payload and the first bandwidth request are transmitted at a same frequency.

* * * * *